United States Patent [19]

Thibeault

[11] Patent Number: 4,846,006
[45] Date of Patent: Jul. 11, 1989

[54] METHOD AND APPARATUS FOR TESTING LINEAR MOTION DEVICES

[75] Inventor: David E. Thibeault, Maynard, Mass.

[73] Assignee: Digital Equipment Corporation, Maynard, Mass.

[21] Appl. No.: 177,054

[22] Filed: Apr. 4, 1988

[51] Int. Cl.⁴ .......................................... G01M 19/00
[52] U.S. Cl. .................................... 73/865.9; 73/866.4
[58] Field of Search ................ 73/862, 862.38, 862.51, 73/865.9, 866.4, 168

[56]  References Cited

U.S. PATENT DOCUMENTS

| 2,859,621 | 11/1958 | Knopf et al. | 73/865.9 |
| 4,235,103 | 11/1980 | Carter et al. | 73/865.9 X |
| 4,435,979 | 3/1984 | Gilgore | 73/866.4 X |
| 4,463,605 | 8/1984 | McDowell et al. | 73/866.4 |
| 4,768,391 | 9/1988 | Hayes | 73/865.9 |

Primary Examiner—Charles A. Ruehl
Attorney, Agent, or Firm—Kenyon & Kenyon

[57] ABSTRACT

A device for testing and evaluating the performance characteristics of a linear motion devices such as, for example, linear actuators, linear step motors and solenoids. Generally, the device of the invention provides a variable force, fixed simulated mass load to a device under test. The preselected fixed mass, variable force load is applied to the output rod of the device under test by a variable torque directly translated to a linear force by, for example, a rack and pinion arrangement. The torque generating means is built to reflect a predetermined mass so as to reflect a constant mass for the load simulated by the mechanical coupling of the rack to the output rod.

12 Claims, 2 Drawing Sheets

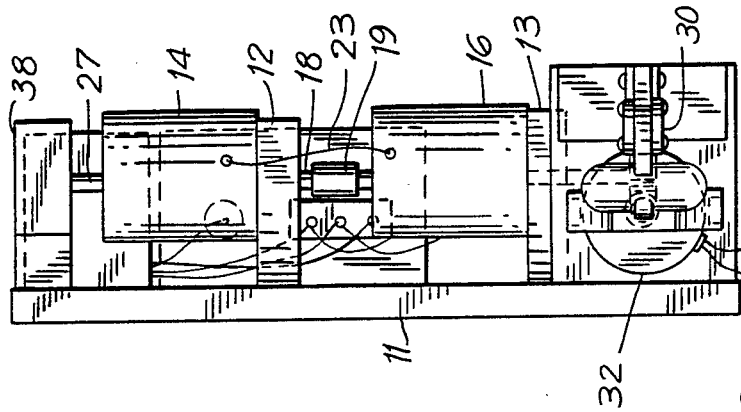
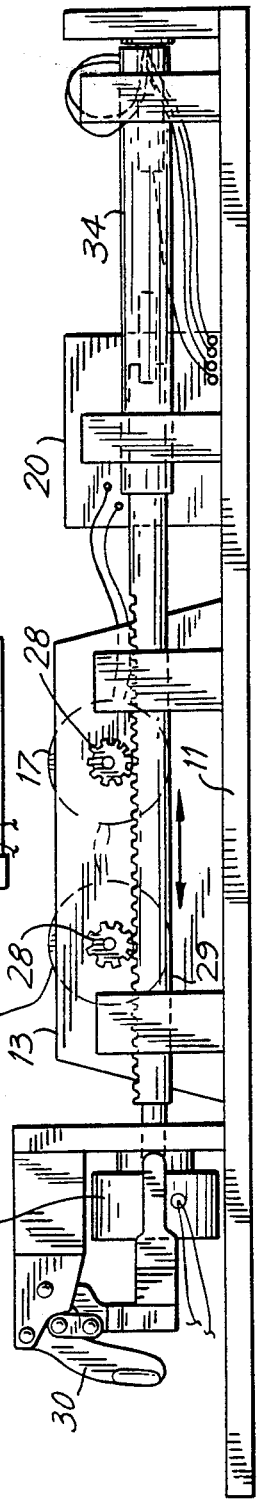

METHOD AND APPARATUS FOR TESTING LINEAR MOTION DEVICES

FIELD OF THE INVENTION

The invention is directed to an apparatus for testing and evaluating the performance characteristics of linear motion devices such as, for example, linear actuators, linear step motors and solenoids. More particularly, the invention provides an apparatus to accurately and independently measure each of the linear velocity and linear position characteristics of a linear motion device.

BACKGROUND OF THE INVENTION

Typically, linear motion devices include an output element, such as a rod, which exerts a force in a linear direction to actuate a control or other device in an electro-mechanical system. In each particular application, it is important to design the linear motion device such that the output element has linear velocity and linear position operating characteristics suitable for the intended operating environment of the device. Several testing methods and apparatuses have been proposed heretofore to enable a designer to measure and evaluate certain operating characteristics of linear motion devices. These prior methods include the use of a calibrated spring, the application of weighted loads and a servo control to apply loads to the device to be tested.

In the calibrated spring method, a calibrated coil spring, for example, is utilized to exert a pushing load against the output rod of a linear device under test. Inasmuch as the forces generated by the spring are known, the position data for the device under test may be observed after application of the known spring load. Although the calibrated spring method is a simple and inexpensive method for evaluating linear motion devices, spring force is not constant over distance and the natural resonances of the spring detract from accurate operation. Moreover, the calibrated spring method does not provide velocity data and position data must be obtained by external observation and measurement. Indeed, a tester is only able to measure characteristics upon device failure and may not determine operating characteristics as a device approaches failure.

Pursuant to the weight approach, weight elements are used to apply a force to the output rod of a linear motion device under test and a position sensor is used to measure the weight element effects upon the position of the output rod. In order to increase the force applied to the device under test, additional weights must be added. The additional weights increase the mass applied as well as the force. Thus, the weight approach varies two variables simultaneously, i.e. mass and force and is not suitable for testing procedures wherein a specific fixed mass application is contemplated for the device under test.

In accordance with the servo control proposal, a servo control is used to apply a force to the output rod of the device under test. The use of the servo control eliminates the effects of mass and thus has the disadvantage of not permitting an evaluation of the device under test as it will operate in an actual system wherein mass has an effect upon operation. Moreover, the servo control adds considerable expense to this approach.

SUMMARY OF THE INVENTION

It is a primary objective of the present invention to provide an accurate test device for measuring and evaluating linear motion devices and wherein evaluative data may be obtained independently for each of linear velocity and linear position of the device under test without the drawbacks of the heretofore known test apparatuses. Generally, the present invention provides an application of force which may be varied while maintaining a fixed simulated mass for the load applied to the device under test. Thus, the present invention enables a tester to vary only the force parameter of the load while holding a simulated mass constant, thereby providing a test procedure which closely simulates the actual system within which the device under test is to be utilized. More specifically, the simulated test mass is matched to the mass of the actual system application intended for the device under test and the force is varied as in that application. This makes it possible to simulate and duplicate actual performance in the intended operating environment under simulations of varying load characteristics as they actually occur in the intended application.

Pursuant to the invention, the preselected fixed mass, variable force load is applied to the output rod of the device under test by a torque directly translated to a linear force by, for example, a rack and pinion arrangement. The rack is mechanically coupled to the output rod of the device under test and the pinion is mechanically coupled to a torque generating means. The torque generating means has a smooth torque vs. rotary angular position characteristic to provide an accurate force application to the device under test. Moreover, the torque generating means is built to have a predetermined mass so as to reflect a constant mass for the load simulated by the mechanical coupling of the rack to the output rod.

In one embodiment of a the invention, the torque generating means comprises four ironless rotor motors. Mechanically, the four motors are arranged in two pairs with the motors of each pair being mechanically coupled to one another and to a pinion in meshing engagement with the rack. The four motors are electrically connected in series to maintain an equal current value in each motor. The use of four motors smooths the total torque applied to the pinions due to the overlapping torque ripple curves of the four motors. Moreover, the utilization of ironles rotor motors assures a smooth torque vs. rotary angular position characteristic.

In the operation of the above-described embodiment of the invention, the torque of the two pinions driven by the two pairs of mechanically coupled ironless rotor motors is directly converted into a linear force by the rack and pinion arrangement. Such linear force presses directly against the output element of the linear motion device under test due to the mechanical coupling between the output element and the rack. The simulated mass is a function of the mass of the rotor motors, which is fixed for a particular test device to match and thereby simulate the mass of the actual intended operating environment for the device. The linear force is controlled by and proportional to the current in the ironless rotor motors such that the current may be varied to simulate actual operating conditions.

Pursuant to a feature of the invention, the motors are in a locked rotor state which eliminates gear backlash problems inasmuch as the pinions are always preloaded against the rack by the locked state.

Accordingly, pursuant to the invention, a controllably variable force is simulated under conditions which reflect a constant, preselected mass to facilitate an accurate duplication of the actual operating environment intended for the device under test. Moreover, the mechanical arrangement between the rotor motors, the rack and pinion and the device under test provides a basis for accurate, direct and independent measurement of each of the linear velocity and linear position of the output rod of the linear motion device.

For example, a velocity sensing device, such as an ironless rotor D.C. tachometer, may be directly, mechanically coupled to a rotor of the torque generating means such that the output voltage of the tachometer is directly proportional to the rotor rotational velocity and, therefor, proportional to the velocity of the output element of the device under test due to the mechanical coupling between the motors and the device under test via the rack and pinion arrangement. The magnitude of the output voltage provides velocity magnitude data while the polarity of the tachometer output voltage is dependant upon the direction of motion. Moreover, a position sensitive device such as a linear voltage differential transducer may be directly, mechanically coupled to the rack. In this manner, a D.C. output voltage is provided by the transducer which is proportional to the linear position of the rack and, therefor, proportional to the linear position of the output element of the device under test which is mechanically coupled to the rack. The direction of change in the level of the output voltage is a function of the direction of motion of the output element and the final voltage level is a function of the final rest position of the output element of the device under test.

The present invention provides a highly advantageous device operable to improve test accuracy and efficiency and to optimize the design of linear motion devices. The use of the invention in conjunction with computer performance simulation software substantially reduces the time required to design a linear motion device while providing test information which is highly suitable and pertinent for design and performance optimization. The invention may be readily utilized to obtain accurate duplications of actual operating conditions for testing a linear motion device and to generate position, position v time, velocity and velocity v time data which are pertinent to such actual operating conditions. Moreover, the data generating capabilities of the test device of the invention afford straightforward means for obtaining information on linear overshoot or undershoot of motion as well as time measurements for velocity ringing and settling. The above advantages are obtained with a relatively straightforward mechanical arranement which is inexpensive to manufacture. In addition, the apparatus may be operated either in a horizontal position to eliminate the effects of gravity upon the operation of the device under test or in a vertical position to include the effects of gravity in the test results.

For a better understanding of the above and other features and advantages of the invention reference should be made to the following detailed description and to the accompanying drawing.

BRIEF DESCRIPTION OF THE DRAWINGS

FIG. 2 is a side view of the test device of FIG. 1.
FIG. 3 is a bottom view of the device of FIG. 2.

DETAILED DESCRIPTION

Figure 1:
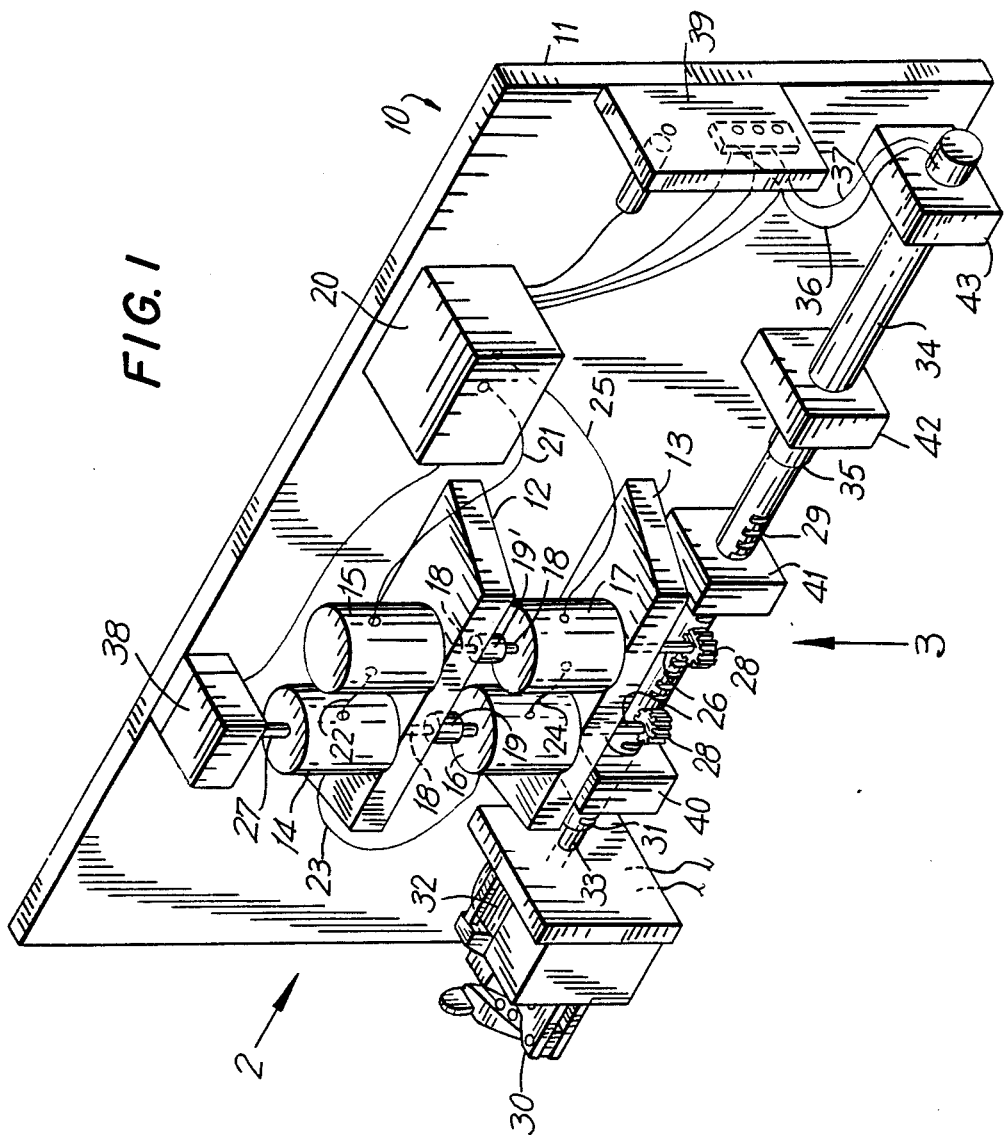
FIG. 1 is a perspective view of a test device according to the invention.

Referring now to the drawings, and initially to FIG. 1, a test device for testing linear motion devices is generally indicated by the reference numeral 10.

The device 10 includes a support panel 11 to mount the various components of the device 10. To that end, two motor mounts 12, 13 are arranged to extend perpendicularly from the panel 11 in a spaced, parallel relation relative to one another. Two ironless rotor motors 14, 15; 16, 17 are mounted in a side-by-side relation on each of the motor mounts 12, 13 such that an output shaft 18 of each motor 14, 15 on motor mount 12 is axially aligned with an output shaft 18 of a complementary motor 16, 17 of the motor mount 13. Each of the motors 16, 17 also includes an output shaft 26 and the motor 14 is provided with an output shaft 27.

A mechanical coupling element 19 is utilized to mechanically couple the aligned shafts 18 of the motors 14, 16 while a similar mechanical coupling element 19' mechanically couples the aligned shafts 18 of the motors 15, 17.

A controllably variable constant current source 20 is mounted on the panel 11 and electrically coupled to the motors 14, 15, 16, 17 by wires 21–25 to provide a series circuit between the current source 20 and the motors 14–17. In this manner, the current source 20 provides a driving electrical force for the motors 14–17 with equal current values for each of the motors 14–17. As should be understood, the driving electrical force provided by the current source 20 activates the ironless rotor motors 14–17 to cause a rotation of the output shafts 18, 26, 27 at a torque determined by the controlled, preselected output of the constant current source 20.

In accordance with the invention, each of the output shafts 26 of the motors 16, 17 are mechanically coupled to a pinion 28 and the pinions 28 are each in a meshing arrangement with a common rack 29 which is mounted for longitudiual movement by support brackets 40, 41 provided on the panel 11. Accordingly, the torque developed by the mechanically coupled motors 14, 16; 15, 7 is directly converted by the rack 29 and pinion 28 arrangement into a linear force, which force is directly proportional to the preselected, controlled current value provided by the constant current source 20.

A mechanical clamp 30 is mounted on the panel 11 at a position proximate to an end 31 of the rack 29 to removably clamp and mount a linear motion device 32, such as a linear actuator, a linear step motor or a solenoid, for testing. The mechanical clamp 30 is arranged and configured relative to the end 31 of the rack 29 such that a linear output element 33 of the removably mounted device under test 32 is axially aligned and in abutting physical contact with the end of the rack 29. In this manner, the linear force of the rack 29 caused by operation of the ironless rotor motors 14–17 is applied directly to the output element 33 of the device under test 32 to simulate a load upon the output element 33.

Pursuant to the invention, the reflected mass of the motor arrangement is designed to approximate the mass of the actual system within which the device under test 32 is to be utilized and the constant current source 20 is controlled to provide a physical linear force of the rack 29 which simulates the forces of such actual application. Thus, the mechanical configuration of the test device 10 provides a straightforward and accurately duplicative test environment to facilitate the measurement of data which are highly pertinent to the contemplated actual operating conditions for the device under test 32. The physical abutment between the element 33 of the device under test 32 and the rack 29 enables a direct measurement of the linear position of the rack 29 to be utilized as an accurate measurement of the linear position of the output element 33. Moreover, the mechanical coupling between the rotating shafts 18, 26, 27 of the motors 14-17 and the output element 33 via the rack 29 and pinion 28 provides a directly proportional relationship between the rotational velocity of the shafts 18, 26, 27 and the linear velocity of the output element 33.

Thus, the operation of the device under test 32 within the device 10 accurately duplicates the actual operation of the device 32 within its intended operating environment and in a manner to facilitate accurate and independent measurement of each of the linear velocity and linear position characteristcs of the device 32. To that end, a position sensitive device 34, such as a linear voltage differential transducer, is mounted to the panel 11 by brackets 42, 42 and is directly mechanically coupled to the end 35 of the rack 29. An output voltage of the position sensitive device 34 is measured via lines 36, 37 to provide continuing output voltage data which is directly proportional to the linear positions of the output element 33 of the device under test 32 throughout operation within the test device 10. The output voltage data therefore provides accurate position v. time information which is directly pertinent to the position v. time characteristics as will occur in the actual operating environment of the device under test 32.

The linear velocity characteristics of the device under test 32 are measured via the rotational velocity of the shaft 27 of the motor 14 as by, for example, a D.C. ironless rotor tachometer 38 which is directly mechanically coupled to the shaft 27. The measuring indicia of the tachometer 38 is calibrated to reflect the linear velocity of the output element 33 of the device under test 32 and, as in the case of measuring linear position, continuous readings may be taken from the tachometer 38 to provide velocity v. time information which is directly pertinent to the velocity v. time characteristics of the device under test 32 in an actual operating environment.

A connect panel 39 may be mounted upon the panel 11 to provide a convenient electrical coupling to external circuitry which may be employed in connection with the operation of the device 10.

The present invention therefore provides a highly advantageous means for accurate simulation of actual operation to substantially reduce design time while facilitating the design of optimized linear motion devices. The device of the invention provides an ability to fix the reflected mass of the device to match the mass of a specified, actual load and to hold the reflected mass constant while vary the force of the load, as in the actual operational application of the device under test. The configuration of the device also permits accurate, continuing and independent measurements of each of the linear velocity and linear position characteristics for the device under test to provide data which are highly pertinent to the operation of the device under test in its actual intended application. Indeed, a worst case analysis may be performed to achieve accurate failure analysis to thereby develop higher performance and higher quality linear motion devices.

What is claimed is:

1. A method for measuring operating characteristics of a linear motion device having an output element, comprising the steps of:
    (a) controllably rotating a shaft element to generate a preselected, variable torque force;
    (b) converting said torque force directly into a linear force, which linear force is exerted through a linear element;
    (c) arranging said shaft element and said linear element to reflect a preselected, fixed mass;
    (d) applying said linear force to said output element by a mechanical coupling between said output element and said linear element;
    (e) independently measuring the linear position of said output element; and
    (f) independently measuring the linear velocity of said output element.

2. The method of claim 1 wherein the step of independently measuring the linear position of said output element is carried out by sensing rhe linear position of said linear element.

3. The method of either of claims 1 or 2 wherein the step of independently measuring the linear velocity of said output element is carried out by sensing the rotational velocity of said shaft element.

4. The method of claim 1 wherein the step of independently measuring the linear position of said output element is carried out over a preselected period of time to obtain position v. time information.

5. The method of claim 1 wherein the step of independently measuring the linear velocity of said output element is carried out over a preselected period of time to obtain velocity v. time information.

6. An apparatus for measuring operating characteristics of a linear motion device having an output element, which apparatus comprises:
    (a) a controllably variable torque generating means operable to generate a preselected torque force;
    (b) a force converting means including a linear element, which force converting means is mechanically coupled to said controllably variable torque generaring means to directly convert said preselected torque force into a linear force exterted through said linear element;
    (c) said torque generating means and said force converting means being arranged to reflect a preselected, fixed mass;
    (d) coupling means for mechanically coupling said output element to said linear element;
    (e) first measuring means for sensing and indicating linear position information for said output element; and
    (f) second measuring means for sensing and indicating linear velocity information for said output element.

7. The apparatus of claim 6 wherein said torque generating means comprises a plurality of ironless rotor motors.

8. The apparatus of claim 7 wherein said plurality of ironless rotor motors includes two pairs of ironless rotor motors with the two ironless rotor motors of each pair being mechanically coupled to one another.

9. The apparatus of claim 8 wherein said ironless rotor motors are electrically coupled in series to one another and to a controllably variable constant current source.

10. The apparatus of either of claims 7, 8 or 9 wherein said force converting means comprises a rack and pinion arrangement mechanically coupled to said ironless rotor motors.

11. The apparatus of claim 6 wherein said first measuring means comprises a linear voltage differential transducer mechanically coupled to said linear element.

12. The apparatus of claim 6 wherein said second measuring meaning means comprises a tachometer mechanically coupled to said torque generating means.

* * * * *